(12) United States Patent
Hoke et al.

(10) Patent No.: US 7,753,034 B2
(45) Date of Patent: Jul. 13, 2010

(54) HYDROCARBON ADSORPTION METHOD AND DEVICE FOR CONTROLLING EVAPORATIVE EMISSIONS FROM THE FUEL STORAGE SYSTEM OF MOTOR VEHICLES

(75) Inventors: Jeffrey Barmont Hoke, North Brunswick, NJ (US); Mark Thomas Buelow, Phillipsburg, NJ (US); John Joseph Kauffman, Hazlet, NJ (US)

(73) Assignee: BASF Corporation,, Florham Park, NJ (US)

( * ) Notice: Subject to any disclaimer, the term of this patent is extended or adjusted under 35 U.S.C. 154(b) by 318 days.

(21) Appl. No.: 11/282,814

(22) Filed: Nov. 18, 2005

(65) Prior Publication Data

US 2007/0113831 A1    May 24, 2007

(51) Int. Cl.
*F02M 33/02* (2006.01)
(52) U.S. Cl. .................. 123/519; 123/518; 55/523; 156/89.22
(58) Field of Classification Search .................. 123/519, 123/521, 522, 518; 55/523, 282.3; 156/89.22
See application file for complete search history.

(56) References Cited

U.S. PATENT DOCUMENTS

| | | | |
|---|---|---|---|
| 4,027,367 A | 6/1977 | Rondeau | |
| 4,218,224 A | 8/1980 | Sun | |
| 4,308,841 A | 1/1982 | Kingsley | |
| 4,390,355 A | 6/1983 | Hammond, Jr. et al. | |
| 4,417,908 A * | 11/1983 | Pitcher, Jr. ................. | 55/523 |
| 4,509,966 A | 4/1985 | Dimick et al. | |
| 4,598,686 A | 7/1986 | Lupoli et al. | |
| 4,637,995 A * | 1/1987 | DeAngelis et al. .......... | 502/439 |
| 4,750,465 A | 6/1988 | Rediker, Jr. et al. | |
| 4,877,001 A | 10/1989 | Kenealy et al. | |
| 4,985,210 A | 1/1991 | Minami | |
| 5,051,244 A | 9/1991 | Dunne et al. | |
| 5,094,218 A | 3/1992 | Everingham et al. | |
| 5,125,231 A | 6/1992 | Patil et al. | |
| 5,158,753 A | 10/1992 | Take et al. | |
| 5,207,734 A * | 5/1993 | Day et al. ................... | 60/278 |
| 5,241,940 A | 9/1993 | Gates, Jr. | |
| 5,464,466 A | 11/1995 | Nanaji et al. | |
| 5,492,679 A | 2/1996 | Ament et al. | |
| 5,914,294 A * | 6/1999 | Park et al. .................. | 502/417 |

(Continued)

FOREIGN PATENT DOCUMENTS

CN          1059701 A          3/1992

(Continued)

OTHER PUBLICATIONS

PCT/US2006/044489 Search Report, May 29, 2007.

(Continued)

*Primary Examiner*—Stephen K Cronin
*Assistant Examiner*—J. Page Hufty (57) ABSTRACT

The present invention is directed to an evaporative emissions control apparatus for minimizing fuel vapor emissions from a fuel storage system in a vehicle with an internal combustion engine. More specifically, the present invention is directed to an evaporative emissions control apparatus comprising a canister filled with a hydrocarbon adsorbent. The present invention is also directed an evaporative emissions control apparatus comprising a support substrate, which is coated with a hydrocarbon adsorbent slurry.

19 Claims, 5 Drawing Sheets

U.S. PATENT DOCUMENTS

| | | | |
|---|---|---|---|
| 5,914,457 A * | 6/1999 | Itakura et al. | 96/130 |
| 5,924,410 A | 7/1999 | Dumas et al. | |
| 5,972,427 A | 10/1999 | Muhlfeld et al. | |
| 6,171,556 B1 | 1/2001 | Burk et al. | |
| 6,237,574 B1 | 5/2001 | Jamrog et al. | |
| 6,432,179 B1 | 8/2002 | Lobovsky et al. | |
| 6,464,761 B1 | 10/2002 | Bugli | |
| 6,540,815 B1 | 4/2003 | Hiltzik et al. | |
| 6,543,427 B2 | 4/2003 | Kawasaki | |
| 6,696,384 B2 | 2/2004 | McCrae et al. | |
| 6,769,415 B2 | 8/2004 | Reddy et al. | |
| 6,773,491 B1 | 8/2004 | Bohl | |
| 6,782,873 B2 | 8/2004 | Streib | |
| 6,792,749 B2 | 9/2004 | Ueno et al. | |
| 6,817,345 B2 | 11/2004 | Lawrence | |
| 6,840,976 B2 * | 1/2005 | Vance et al. | 55/523 |
| 6,863,984 B2 | 3/2005 | Hoke et al. | |
| 6,896,852 B1 * | 5/2005 | Meiller et al. | 422/180 |
| 6,905,536 B2 * | 6/2005 | Wright | 96/134 |
| 7,008,461 B2 * | 3/2006 | Kuki et al. | 55/282.3 |
| 7,021,296 B2 * | 4/2006 | Reddy | 123/520 |
| 7,033,452 B2 * | 4/2006 | Yamada et al. | 156/89.22 |
| 2002/0029693 A1 | 3/2002 | Sakakibara et al. | |
| 2002/0073847 A1 | 6/2002 | Sheline et al. | |
| 2002/0174857 A1 | 11/2002 | Reddy et al. | |
| 2003/0192512 A1 | 10/2003 | Luley et al. | |
| 2004/0031469 A1 | 2/2004 | Reddy | |
| 2004/0083894 A1 | 5/2004 | Koyama et al. | |
| 2004/0226440 A1 * | 11/2004 | Foong et al. | 95/146 |
| 2005/0081717 A1 | 4/2005 | Meiller et al. | |
| 2006/0065251 A1 | 3/2006 | Meiller et al. | |

FOREIGN PATENT DOCUMENTS

| | | |
|---|---|---|
| DE | 36 09 976 C2 | 4/1996 |
| DE | 195 14 887 A1 | 10/1996 |
| JP | JP-63-176650 | 7/1988 |

OTHER PUBLICATIONS

US 5,867,697, 11/1997, Ihikawa (withdrawn).

* cited by examiner

Fig. 7

HYDROCARBON ADSORPTION METHOD AND DEVICE FOR CONTROLLING EVAPORATIVE EMISSIONS FROM THE FUEL STORAGE SYSTEM OF MOTOR VEHICLES

FIELD OF THE INVENTION

This invention is directed to a method and device for controlling evaporative hydrocarbon emissions from motor vehicles. More specifically, this invention is directed to a method and device for adsorbing hydrocarbon vapors within the fuel storage system of the motor vehicle before the hydrocarbon vapors can be released to the atmosphere.

BACKGROUND OF THE INVENTION

When fuel is added to a fuel reservoir, such as the gasoline tank of an automobile from a conventional gas dispenser apparatus such as the dispensing nozzle of a gasoline dispenser, gasoline vapor is displaced from the gasoline tank. If the vapor is not collected in some way, it will be released into the atmosphere. Due to the large number of automobile refuelings, such releases of fuel vapor constitute a significant hazard to the environment, particularly in heavily populated areas. Releases of these vapors which are composed of volatile organic compounds (VOC's) such as hydrocarbons, are presently the subject of significant and increasing federal and local regulation.

Generally, such evaporative emissions result from the venting of fuel vapors from the fuel tank due to diurnal changes in ambient pressure and/or temperature, the vaporization of fuel by a hot engine and/or exhaust system, and the escape of fuel vapors during refueling of the vehicle. The venting of fuel vapor from the fuel tank due to diurnal pressure and/or temperature changes (i.e., diurnal emissions) is responsible for a majority of evaporative emissions. Diurnal changes in pressure and/or temperature cause air to flow into and out of the fuel tank. Air flowing out of the fuel tank inevitably carries fuel vapor, which is created by the evaporation of fuel into the air contained above the fuel within the fuel tank. If this flow of air is left untreated and is allowed to escape directly into the atmosphere, undesirable emissions occur.

Motor vehicle manufacturers have reduced the level of diurnal emissions through the use of evaporative canisters. Generally, an evaporative canister has a vapor inlet, a purge port, and a vent port. The vapor inlet is fluidly connected by a vapor conduit to the air space in the fuel tank. Diurnal changes in pressure and/or temperature cause air within the fuel tank to flow through the vapor conduit and into the evaporative canister via the vapor inlet. The air carries fuel vapor and/or hydrocarbons. The evaporative canister contains a sorbent material, such as an activated carbon, that strips fuel vapor from the air as it flows through the canister. The treated air then flows out the vent port and into the atmosphere. The purge port is fluidly connected by a valved purge conduit to the combustion air intake of the motor vehicle engine. When the engine is running, the combustion air intake is at sub-atmospheric pressure, and the valve is opened to thereby connect the purge port to the combustion air intake. Fresh air is drawn by the sub-atmospheric pressure through the vent port and into the evaporative canister. The fresh air flows through the sorbent material, out the purge port and into the combustion air inlet. The flow of fresh air through the evaporative canister strips sorbent material of stored fuel vapor and/or hydrocarbons, thereby purging the evaporative canister of hydrocarbons.

DE 36 09 976 C2 discloses an activated carbon filter for a fuel supply system of a motor vehicle which includes a container filled with activated carbon particles. This container includes at one side an opening for the admission of fresh air which opening is covered by filter material. At the opposite side of the container, means are provided for the connection of the activated carbon filter to the fuel supply system. In the area of the opening for the admission of fresh air to the activated carbon filter, an electric heating arrangement is provided in the form of a metallic grid structure. When the engine is shut down, hydrocarbon-containing gas evaporates from the fuel supply system and reaches the activated carbon filter, which adsorbs the hydrocarbons. As the engine is started, fresh air flows into the activated carbon filter through the respective opening. The fresh air is preheated by the heating arrangement, whereby the activated carbon filter is regenerated as soon as engine operation begins and the hydrocarbons adsorbed by the activated carbon particles are released and supplied to the internal combustion engine for combustion therein.

It is further known from DE 195 14 887 A1 to provide in air cleaning systems a thin filter layer consisting of an adsorbing cover fleece which may contain activated carbon.

Other systems and methods for trapping volatile hydrocarbon fuel vapors, from the fuel tank of an automobile are also well known. One such system is typically referred to as an evaporative loss control system and relys on a canister containing a regenerable adsorbent such as activated charcoal. The adsorbent adsorbs the volatile hydrocarbons and when engine operating conditions are appropriate for combusting the trapped hydrocarbons, a stream of air is passed through the adsorbent to desorb the adsorbent and the hydrocarbon-laden air stream is passed into the engine where the desorbed hydrocarbons are combusted. Exemplary U.S. patents disclosing evaporative loss control systems include the following: U.S. Pat. Nos. 4,877,001; 4,750,465; and 4,308,841.

However, the storage capacity of the active charcoal filter drops continuously with an increase in the quantity of the stored hydrocarbons and it is therefore necessary to regenerate the active charcoal filter at regular intervals; that is, it is necessary to again remove the stored hydrocarbons from the active charcoal filter. For this purpose, the active charcoal filter is connected via a regeneration valve to an intake manifold of the engine which functions to induct combustion air. By opening the regeneration valve, a pressure drop develops between the active charcoal filter and the intake manifold by means of which the hydrocarbons, which are stored in the active charcoal filter, are conducted into the intake manifold in order to finally be combusted in the engine and thereby be disposed of.

Due to incomplete desorption of the hydrocarbons, minute levels of hydrocarbons may remain stored in the adsorbent material of a purged evaporative canister. The term "heel" as used herein refers to residual hydrocarbons generally present on an adsorbent material when the canister is in a purged or "clean" state and may result in a reduction of the adsorption capacity of the adsorbent. Bleed emissions, on the other hand, refer to emissions that escape from the adsorbent material. Bleed can occur, for example, when the equilibrium between adsorption and desorption favors desorption significantly over adsorption. The heating of the fuel tank may causes air to flow from the fuel tank, through the canister, out the vent port and into the atmosphere. If conditions favor desorption (e.g., incomplete desorption of the adsorbent, thereby lowering adsorption capacity), the air may carry bleed emissions out of the canister and into the atmosphere.

For economic reasons, use of activated carbon dominates commercially, either in the form of a canister filled with extruded granules or a monolith extruded with carbon. However, as worldwide evaporative emission regulations become more and more stringent, the technical limitations of carbon-based systems become more and more apparent. In particular, an excessively high "bleed" rate or the formation of a permanent hydrocarbon heel often make the design and use of carbon-based systems problematic. As a result, the development of new materials and systems is desired.

Zeolite-based systems are a possible alternative to those of carbon for controlling evaporative emissions from the fuel storage system of motor vehicles. Although zeolites are generally more expensive than carbon, the hydrocarbon adsorption properties of zeolites may overcome the inherent bleed rate and heel formation problems associated with carbon. The use of zeolites materials for adsorbing uncombusted hydrocarbons in the exhaust gas stream of an automobile is also well known. These systems and methods are particularly useful for adsorbing uncombusted hydrocarbons emitted during the cold start of the automobile engine.

For example, U.S. Pat. No. 4,985,210 is directed to an exhaust gas purifying apparatus for an automobile employing a three-way catalyst with either a Y-type zeolite or a mordenite used in a hydrocarbon trap upstream of the three-way catalyst. In the embodiment of FIG. 2 of U.S. Pat. No. 4,985,210, a bed of activated carbon is disposed upstream of an adsorbent zone. A solenoid-operated valve mechanism serves to direct the exhaust gas stream either through or around the activated carbon bed, depending on the temperature of the exhaust gas stream, and then through the adsorbent zone and the three-way catalyst.

U.S. Pat. No. 5,051,244 is directed to a process for treating an engine exhaust gas stream in which the gas stream is directed through a molecular sieve in an adsorbent zone during the cold-start phase of engine operation. When the hydrocarbons begin to desorb, the adsorbent zone is by-passed until the catalyst is at its operating temperature, at which point the gas stream is again flowed through the adsorbent zone to desorb hydrocarbons and carry them to the catalyst zone. A paper by M. Heimrich, L. Smith and J. Kotowski entitled Cold-Start Hydrocarbon Collection for Advanced Exhaust Emission Control, SAE Publication Number 920847, discloses an apparatus which functions in a manner similar to that of U.S. Pat. No. 5,051,244.

U.S. Pat. No. 5,125,231 discloses an engine exhaust system for reducing hydrocarbon emissions, including the use of beta zeolites as hydrocarbon adsorbents. Zeolites having a silica/alumina ratio in the range of 70/1 to 200/1 are preferred adsorbents. The apparatus includes by-pass lines and valves to direct exhaust gases from a first converter directly to a second converter during cold-start operation and when the first converter reaches its light-off temperature, to either by-pass the second converter or recycle effluent from it to the first converter.

U.S. Pat. No. 5,158,753 discloses an exhaust gas purifying device comprising: a catalyst device installed in the exhaust gas path of an internal combustion engine for treating the exhaust gas of the engine; an adsorbing device installed in the exhaust gas path between the catalyst device and the internal combustion engine, for treating the exhaust gas of the engine. One embodiment includes a heat exchanger for performing heat transfer between the exhaust gas flowing from the internal combustion engine to the adsorbing device and the exhaust gas flowing from the adsorbing device to the catalyst device. Alternatively, the catalyst device includes a catalyst secured in the low-temperature-side gas flow path of a heat exchanger, and the exhaust gas flowing from the internal combustion engine to the adsorbing device is allowed to flow to the high-temperature-side gas flow path of the heat exchanger.

U.S. Pat. No. 6,171,556 discloses a method and apparatus for treating an exhaust gas stream containing hydrocarbons and other pollutants. The method comprises the steps of flowing the exhaust gas stream through a catalytic member comprising a monolith body having a first catalyst zone and a second catalyst zone therein to contact a catalyst in a first catalyst zone to convert at least some of the pollutants in the exhaust gas stream into innocuous products. The exhaust gas stream is then discharged from the catalytic member and flowed through an adsorbent zone to adsorb at least some of the hydrocarbon pollutants with an adsorbent composition. The exhaust gas stream is discharged from the adsorbent zone and flowed to the second catalyst zone to convert at least some of the pollutants into innocuous products. The exhaust gas stream, so treated, is then discharged to the atmosphere through suitable discharge means. A preferred adsorbent is a zeolite, having a relatively high silica to alumina ratio and a low relative Bronsted acidity. The preferred adsorbent compositions comprise beta zeolites.

As discussed above, zeolites are often used as coatings on monolithic substrates for various high temperature adsorption and catalytic applications. In these cases, inorganic binder systems are used that survive exposure to high temperatures (e.g., >500° C.) and provide good coating adhesion. However, for low temperature application (e.g., <500° C.), inorganic type binders are often not suitable since their binding characteristics are severely diminished. In these low temperature applications, organic polymer binders are ideal since they are structurally stable and provide excellent coating adhesion. This is accomplished by the addition of suitable stabilizing agents to the slurry formulation.

For example, commonly assigned U.S. Patent Publication No. 2004/0226440, incorporated herein by reference, discloses a hydrocarbon adsorption unit. The unit is positioned in the air intake system of an automobile engine and has an air intake and air outlet. According to the application the adsorber material may be silica gel, a molecular sieve and/or activated carbon and contains an organic polymer binder, as well as an anionic, nonionic or cationic dispersant, that will cause the material, preferably as an aqueous slurry, to adhere to the surface of a substrate.

However, without proper choice of these stabilizing agents, interparticle agglomeration of zeolite particles or coagulation of zeolite and binder particles will occur, thus rendering the slurry unstable for coating application. As a result, a zeolite-based coating formulation must be developed that not only has good adhesion (particularly to metal substrates) at low temperature, but also excellent adsorption characteristics.

Therefore, it is an objective of the present invention to provide an improved evaporative emission control system for controlling evaporative emissions from a motor vehicle's fuel storage system.

SUMMARY OF THE INVENTION

An evaporative emission control apparatus is provided in a vehicle, which has an internal combustion engine (hereinafter, referred to as an engine), to remove fuel vapor generated in a fuel storage system and thereby reducing the fuel vapor released into the atmosphere. The evaporative emission control apparatus of the present invention comprises a fuel storage system, e.g., a fuel tank, an evaporative vapor vent line, a canister containing a hydrocarbon adsorbent, and a clean air vent line to the atmosphere. The fuel vapor that bleeds from the fuel tank is removed from the air by the adsorbent in the canister, so that the amount of fuel vapor released into the atmosphere is reduced. At the time of operating the engine, atmospheric air is introduced into the canister as a purge stream, whereby the hydrocarbons, which were previously adsorbed by the hydrocarbon adsorbent are desorbed and recirculated to the engine for combustion through a purge line.

In another embodiment, the canister of the evaporative emission control apparatus contains a support substrate, for example, a flow through monolithic support, which is coated with a hydrocarbon adsorbent slurry for the reduction of evaporative hydrocarbon emissions in a motor vehicle. An undercoat layer can be used to further improve the adhesion of the slurry washcoat to the substrate surface.

BRIEF DESCRIPTION OF THE DRAWINGS

The present invention will become more fully understood from the detailed description and the accompanying drawings, wherein.

DETAILED DESCRIPTION OF THE INVENTION

The evaporative emission control apparatus of the present invention comprises a fuel storage system, e.g., a fuel tank, an evaporative vapor vent line, a canister containing a hydrocarbon adsorbent, and a clean air vent line to the atmosphere. In one embodiment, the canister is filled with hydrocarbon adsorbent particles. In another embodiment, the hydrocarbon adsorbent material is formulated into a slurry that is coated onto a support substrate, e.g., a flow through monolithic support, that is placed within the evaporative emission treatment canister.

Figure 1:
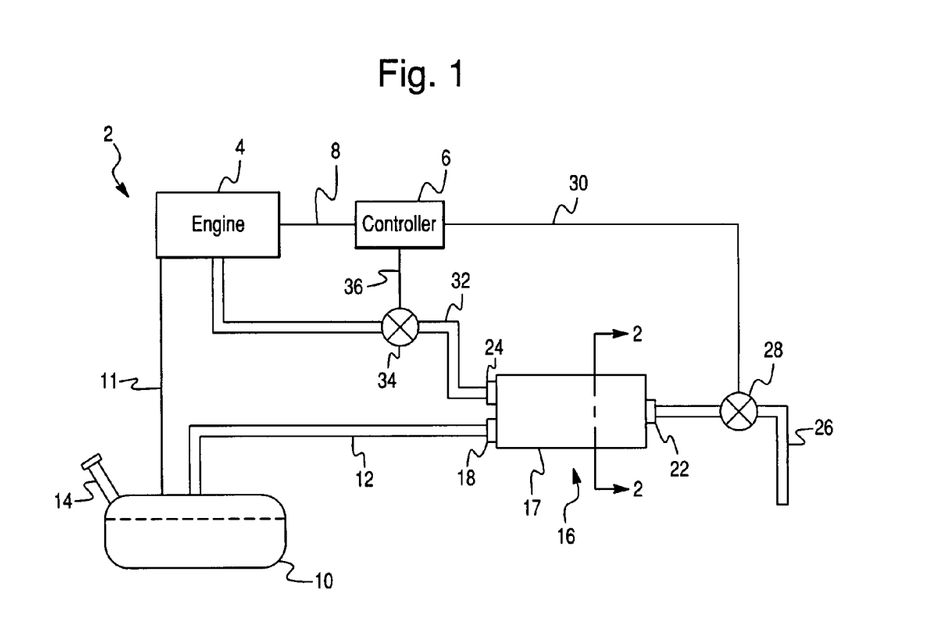
FIG. 1 is a functional block diagram of an evaporative control system for a vehicle, in accordance with one embodiment of the present invention.
Figure 2A:
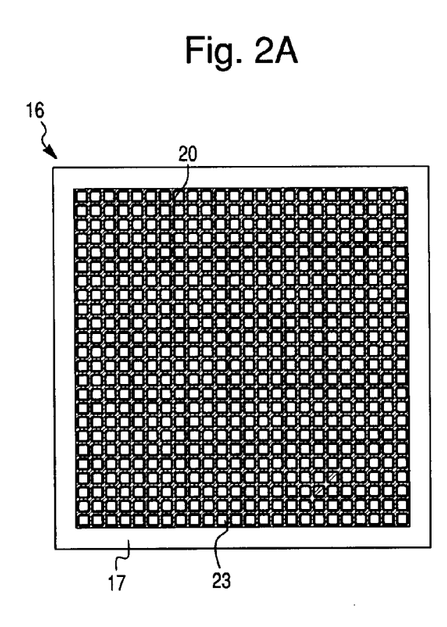
FIG. 2A is a cross-sectional view of a canister containing a hydrocarbon adsorbent, in accordance with one embodiment of the present invention taken across line 2-2 of FIG. 1.
Figure 2B:
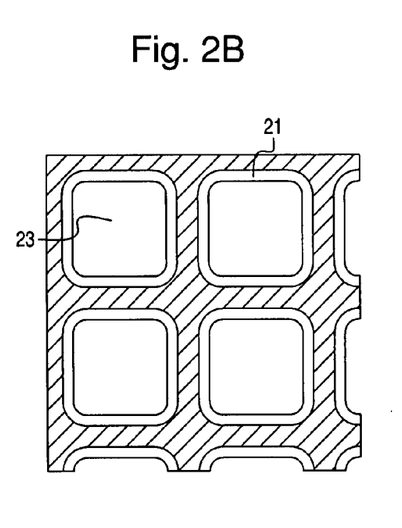
FIG. 2B is an enlarged view of flow-through cells of the honeycomb monolithic of FIG. 2A.

Referring now to FIGS. 1 and 2, an evaporative emission control system 2 for a vehicle including an engine 4 is illustrated and represents one non-limiting embodiment of the present invention. The evaporative emission control system 2 of this embodiment comprises a fuel tank 10, an evaporative vapor vent line 12, a canister 16 containing a hydrocarbon adsorbent material 21, and a clean air vent line 26 to the atmosphere. The canister 16 further comprises a housing 17 containing a monolithic support 20 coated with a hydrocarbon adsorbent material 21, preferably as an aqueous slurry (described in more detail hereinbelow).

The monolith 20 can be of the standard ceramic or metallic "honeycomb" design typically used in automotive catalyst applications or a wall-flow monolith, as disclosed in U.S. Pat. Nos. 4,390,355, 4,509,966, and 5,492,679, incorporated herein by reference. Modifications to cell shape, cell density, and in the case of metallic monoliths, foil design, to improve mass transfer and vapor contact are possible (e.g., skew or herringbone foil design). Other monolithic substrate designs that are suitable for this application include metallic and ceramic foams, heat exchangers (e.g., those typically used for automobile radiators or stationary air conditioning condensers), and expanded metallic foil (e.g., aluminum) honeycomb typically used as structural design material. Use of coated metallic screens, meshes, and woven wires is also considered within the scope of the invention. Due to the low temperature environment of the fuel storage system and the component canister, support substrates manufactured from plastic (e.g., plastic extruded monolith, expanded Nomex honeycomb, etc.), polymeric fibers (e.g., nonwovens), and polymeric foam (e.g., polyurethane) are also possible. Preferably, the substrate surface comprises a polymer or a metal such as aluminum, titanium, stainless steel, a Fe—Cr. alloy or a Cr—Al—Fe alloy in the form of a sheet, mesh, foil, etc. In order to increase the surface area of the adsorbent, it is desirable that the metal substrate be present in a corrugated mode. Typically, the hydrocarbon adsorbent will be deposited on the substrate in a loading of about 0.2 to about 5 $g/in^3$, preferably from about 1.25 $g/in^3$ to about 3 $g/in^3$.

Referring again to FIGS. 1 and 2, the engine 4 is preferably an internal combustion engine that is controlled by a controller 6. The engine 4 typically burns gasoline, ethanol and other volatile hydrocarbon-based fuels. The controller 6 may be a separate controller or may form part of an engine control module (ECM), a powertrain control module (PCM) or any other vehicle controller.

During engine operation, gasoline is delivered from a fuel tank 10 by a fuel pump through a fuel line to the fuel injector, all shown schematically by line 11. The timing and operation of the fuel injectors and the amount of fuel injected are managed by the controller 6, via signal line 8. The fuel tank 10 is typically a closed container except for an evaporative vapor vent line 12 and a fill tube 14. The fuel tank 10 is often made of blow molded, high density polyethylene provided with one or more gasoline impermeable interior layers.

The fuel tank 10 includes an evaporative vapor vent line 12 that extends from the fuel tank 10 to an evaporative emission treatment canister 16. Fuel vapor, containing hydrocarbons, which have evaporated from the fuel tank 10, can pass from the fuel tank 10 to the emission treatment canister 16 through evaporative vapor vent line 12. In this particular embodiment, the canister 16 comprises a housing 17 containing a monolithic support 20, which is coated with a hydrocarbon adsorbent material 21. The monolith shown in FIG. 2 as a honeycomb, contains individual flow-thorough cells 23, the interior of which are coated with a layer of hydrocarbon adsorbent material 21. The flow-through cells 23 can be of a square cross section, as shown, or of any other configurations. As noted above the monolith can be of any useful shape that will hold a layer of hydrocarbon adsorbent, and allow vapor contact with the adsorbent. The canister 16 may be formed from any suitable material. For example, molded thermoplastic polymers such as nylon are typically used.

Fuel vapor pressure increases as the temperature of the gasoline in fuel tank 10 increases. Without the evaporative emission control system 2 of the present invention the fuel vapor would be released to the atmosphere untreated. However, in accordance with the present invention fuel vapors are treated by emission treatment canister 16. When the vent valve 28 is open, and purge valve 34 closed, fuel vapors flow under pressure from the fuel tank 10 through the evaporative vapor vent line 12, the vapor inlet 18 and subsequently through the flow-through cells 23 of monolithic support 20. The flow-through cells 23 of monolithic support 20 are coated with a hydrocarbon adsorbent material 21, which adsorb hydrocarbons in the fuel vapors. Once treated, fuel vapors initially from fuel tank 10 exit the canister 16 as clean air via vent opening 22, and vent line 28, thereby being released to the atmosphere.

Gradually, the hydrocarbon adsorbent material becomes laden with hydrocarbons adsorbed from the fuel vapor. When the hydrocarbon adsorbent 21 becomes saturated with hydrocarbons, the hydrocarbons must be desorbed from the hydrocarbon adsorbent 21 for continued treatment of fuel vapors from fuel tank 10. During engine operation engine controller 6 commands valves 28 and 34, via signal leads 30 and 36, respectively, to open, thereby opening an air flow pathway between the atmosphere and the engine 4. The opening of the purge valve 34 allows clean air to be drawn in via the clean air vent line 26 from the atmosphere. The clean air, or purge air, flows in through the clean air vent line 26 past the vent opening outlet 22 and into canister 16. The clean air then flows through the monolithic support substrate 20 and through the individual flow-through cells 23. The flow-through cells 23 are coated with a hydrocarbon adsorbent 21, which is saturated with hydrocarbons. The clean air desorbs the hydrocarbons from the saturated hydrocarbon adsorbent 23. A stream of purge air and hydrocarbons then exits canister 16 through purge outlet 24 and purge line 32. The purge air and hydrocarbons flow through purge line 32 and through purge valve 34 to the engine 4. The fuel-laden air is directed through the purge line 32 and the purge valve 34 into the engine 4, where the hydrocarbons are subsequently combusted. In another embodiment, the emission control system of this embodiment can be used in conjunction with a downstream hydrocarbon bleed emission scrubber (as described in further detail hereinbelow, see FIG. 7).

Figure 3:
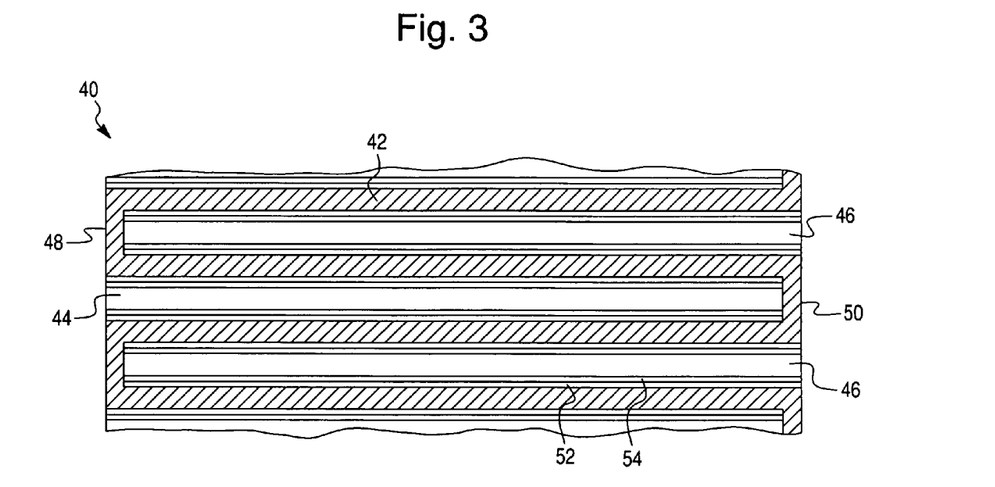
FIG. 3. is an enlarged longitudinal cross-sectional view of a wall-flow monolith, in accordance with one embodiment of the present invention.

Referring now to FIG. 3, a wall-flow monolithic substrate 40, within the housing of an emission treatment canister (not shown), is illustrated and represents one non-limiting embodiment of the present invention. The wall-flow monolithic substrate 40 comprises a large number of interconnected and interlaced, thin porous internal walls 42. The internal walls 42 define internally thereof, two groups of parallel passages including inlet passages 44 and outlet passages 46, respectively, each extending to opposite ends of the wall-flow monolith 40. The inlet passages 44 are open at the inlet end 48 and are closed at the outlet end 50 of the wall-flow monolith 40. While the outlet passages 46 are closed at inlet end 48 and open at the outlet end 50, the wall-flow monolith. The inlet and outlet passages 44 and 46, respectively, can be of a square cross section, as shown, or of any other configurations. Further, the inlet and outlet passages 44 and 46, respectively, are arranged in vertical and horizontal rows (as viewed in cross section) with the inlet passages 44 alternating with outlet passages 46 in a checkerboard pattern. Thus, it will be appreciated that each internal wall portion 42 of the substrate lies between an inlet passage 44 and an outlet passage 46 at every point of its surface. Consequently, the inlet passages 44 are spaced from one another by intervening outlet passages 46 and vice versa. The construction of the wall-flow monolith 40 is such that the interior walls 42 are porous so as to permit the passage of exhaust gas therethrough from the inlet passages 44 to the outlet passages 46.

In yet another embodiment, a porous, hydrocarbon repellant membrane (e.g., organofluorine containing) may optionally be coated on the wall-flow monolith. The hydrocarbon repellant membrane would reduce the flow of evaporative hydrocarbon emissions from exiting the monolith and entering the atmosphere. A hydrocarbon adsorbent coating (e.g., zeolite) can be applied to the monolith between the surface of the monolith and the hydrocarbon repellant membrane, to further increase the hydrocarbon trapping ability of the wall-flow monolith. The hydrocarbon repellent membrane coating on top of the hydrocarbon adsorbent coating would be on the fuel vapor side of the interior walls of a wall-flow monolith, thus, inhibiting passage of hydrocarbons through the interior walls of a wall-flow monolith. The hydrocarbon adsorbent 52 is coated on the interior surfaces of the interior walls 42 of the inlet passages 44 and/or the outlet passages 46. Optionally, a hydrocarbon repellant membrane 54 can be applied to the exterior surface of the hydrocarbon adsorbent coating.

In accordance with this embodiment, fuel vapors are treated by an emission treatment canister, which contains a wall-flow monolith 40. The fuel vapor enters the inlet passages 44 of the wall-flow monolith 40. The hydrocarbon molecules in the exhaust gas are partially blocked by the use of a hydrocarbon repellent membrane 52 as the fuel vapor passes through the interior walls 42 of the wall-flow monolith 40 from the inlet passages 44 to the outlet passages 46, thereby removing the hydrocarbons from the fuel vapor prior to being release to the atmosphere.

The hydrocarbon adsorbent of the present invention may be silica gel, a molecular sieve, activated carbon or mixture thereof. The material may be disposed on the support substrate, e.g., the monolithic substrate, as a single layer or separate layers of silica gel, a molecular sieve or activated carbon. Preferably, the material comprises a molecular sieve alone or in admixture with about 5 to about 50 weight percent of an activated carbon having a pore size of about 5 to about 500 angstroms. In one particularly preferred embodiment, the hydrocarbon adsorbent material of the present invention is a zeolite-based hydrocarbon adsorption slurry.

The zeolite-based hydrocarbon adsorption slurry of the present invention comprises one or more zeolite hydrocarbon adsorbents and a binder. The adsorbent material may include any known natural or synthetic zeolite such as faujasite, chabazite, clinoptilolite, mordenite, silicalite, zeolite X, zeolite Y, ultrastable zeolite Y, ZSM zeolite, offretite, or a beta zeolite. Preferred zeolites include ZSM, Y and beta zeolites. The particularly preferred adsorbent comprises a beta zeolite of the type disclosed in U.S. Pat. No. 6,171,556 incorporated herein by reference in its entirety.

A preferred zeolite-based adsorbent material is a zeolite having a high silica to alumina ratio. Generally, sieve materials having so-called three dimensional pore configurations are preferred over sieve materials having one- or two-dimensional pore configurations, although some of the latter function acceptably well. Acceptable materials typically have a micropore diameter of from about 3 to 8 angstroms. The zeolites, preferably beta zeolites may have a silica/alumina molar ratio of from at least about 25/1, preferably at least about 50/1, with useful ranges of from about 25/1 to 1000/1, 50/1 to 500/1 as well as about 25/1 to 300/1, from about 100/1 to 250/1, or alternatively from about 35/1 to 180/1 is also exemplified. The preferred beta zeolites are ion-exchanged beta zeolites, such as H/beta zeolite and Fe/beta zeolite.

As previously mentioned, preferred zeolites may include ZSM, Y and beta zeolites, with beta zeolites particularly preferred. The preferred zeolites can be treated to reduce the number of acid sites. This can be accomplished by leaching the zeolite with an organic or inorganic acid. Preferred acids include strong inorganic acids, such as sulfuric acid, nitric acid, hydrochloric acid, phosphoric acid and the like, and carboxylic acids such as trifluoro acetic acid, and dicarboxylic acids such as oxalic, malonic, succinic, glutaric, adipic, maleic, fumaric, phthalic and the like. Useful acids preferably include polyacids, preferably difunctional acids, more preferably dicarboxylic acids with oxalic acid most preferred. The acid use is at a concentration of 0.02 to 12N, preferably 0.1 to 10N, and a solid zeolite concentration of 0.01 to 1.0 g/ml and preferably 0.05 to 0.5 g/ml. The leaching is conducted at a suitable temperature range, typically of from 10 to 100° C.; for example, preferably at 70 to 100° C. when using sulfuric acid and from 10 to 50° C. when using oxalic acid. The leaching is conducted for a sufficient time to achieve the desired silica to alumina ratio attainable at the leach conditions and concentrations, and is typically from about 0.5 to 5 hours, and preferably 0.5 to 3 hours.

The zeolite can be steam treated with steam at from 350 to 900° C. Preferably, the stream treatment is conducted at from 400 to 800° C., and more preferably 500 to 750° C. with a most preferred range being from 550 to 750° C. The steam temperature can be increased at a suitable rate such as from 100 to 600° C. per hour. A useful steam concentration is from 10 to 100% and preferably 30 to 100% with a preferred concentration at from about 50 to 100% with the balance being air. The steaming is preferably conducted at atmospheric pressure. The duration of the steam treatment is sufficient to treat the zeolite and is typically from 0.5 to 48 hours, preferably 0.5 to 24 hours, more preferably from 0.5 to 8 hours and most preferably 0.5 to 5 hours. The steam treatment is believed to reduce the acidity of the zeolite by removing at least some of the aluminum from the framework of the zeolite. Steam treated zeolites have been found to have an increased durability when used to adsorb hydrocarbons in gaseous streams and to resist coke formation. Preferably, the zeolite can be treated with both leaching and steam treatment. In a particularly preferred process, the zeolite is first acid leached followed by steam treatment. Optionally, the steps of steam treatment and steaming can be repeated in any desired order. For example, leached and steamed zeolite can be repeatedly leached followed by steaming. In a specific embodiment the zeolite can be leached, steamed and leached again.

A useful method to treat beta zeolite is disclosed, for example in CN 1059701A, published Mar. 25, 1992 and herein incorporated by reference. This reference discloses a high Si beta zeolite produced by calcining to remove nitrogen compounds from a beta zeolite made through an organoamine template process. Leaching the beta zeolite is accomplished with an organic or inorganic acid solution having a concentration of 0.02 to 12N, preferably 0.1 to 10N, and a solid zeolite concentration of 0.01 to 1.0 g/ml and preferably 0.05 to 0.5 g/ml at from 10 to 100° C. for 0.5 to 5 hours, and preferably 1 to 3 hours. The leaching is followed by treating the zeolite with steam at from 400 to 900° C. with the steam temperature increasing at from 100 to 600° C. per hour. A useful steam concentration is 100% at a system pressure of 50 to 500 KPa. The duration of the steam treatment is from 0.5 to 5 hours.

Of particular interest with regard to the present invention is the acidity which is imparted by the alumina in the zeolite framework. It is believed that the high silica to alumina ratio attained by leaching is related to the acidity of the zeolite. The acidity of the zeolite is believed to affect the durability of the zeolite when used to adsorb hydrocarbons from exhaust streams such as automotive and industrial exhaust steams which are typically at temperatures in the range of from 300 to 800° C. and more typically from 350 to 600° C. The zeolite, when used in such environments tends to lose adsorption efficiency due primarily to clogging of the pores and/or collapse of the zeolite framework. Maintenance of the stable zeolite framework can be attained by controlling the conditions under which the zeolite is treated. Such conditions include acid concentrations, steam temperatures and the like. Milder conditions reduce the tendency for the zeolite framework to deteriorate during treatment and permit the framework to be stabilized at the location where the alumina was removed.

Additionally, it is believed that steam treatment removes aluminum from the zeolite framework. The affected aluminum continues to reside in the zeolite, probably in the pores. The zeolite framework is believed to stabilize without the aluminum and the aluminum ions in the pores becomes alumina. The remaining alumina in the pores is believed not contribute to the acidity of the zeolite which is reduced. The alumina in the pores can remain or be washed or leached out in a subsequent leaching step.

The zeolite, non-steamed or steamed, has been found to have improved coking resistance, i.e., the formation of coke during engine testing has been significantly reduced. While acid leaching methods to increase the silica to alumina ratio of a zeolite are known to decrease acidity, such methods are believed to remove aluminum atoms from zeolite particles indiscriminately. Methods such as steaming remove the aluminum from the framework of the zeolite preferentially at the Bronsted acid sites. The importance of this can be recognized by both more effective resistance to coking and by the knowledge of how to treat a zeolite to attain such performance with minimizing deterioration of the framework. In essence, leaching a zeolite to death will result in reduced Bronsted acidity; but using a method such as steam treatment alone, or more preferably balanced with leaching results in a more durable zeolite for use as a hydrocarbon adsorber in accordance with the present invention.

In one embodiment, a metallic support substrate of the present invention can be coated with an undercoat high-surface area component, said component comprising a pre-treatment metallic thermal arc sprayed layer and optionally a washcoat layer, such as aluminum oxide, cerium oxide, and zirconium oxide. The metallic thermal arc sprayed layer coating can be useful to facilitate the adhesion of the washcoat layer, as well as additional undercoat layers. The metallic thermal arc sprayed layer of the present invention can be applied with a thermal spraying processes in general, including plasma spraying, single wire plasma spraying, high velocity oxy-fuel spraying, combustion wire and/or powder spraying, electric arc spraying, etc.

In one aspect of the present invention, electric arc spraying, e.g., twin wire arc spraying, of a metal (which term, as used herein and in the claims, includes mixtures of metals, including without limitation, metal alloys, pseudoalloys, and other intermetallic combinations) onto a metallic monolith honeycomb support substrate yields a structure having unexpectedly superior utility as a substrate for a washcoat layer, e.g., a refractory metal oxide or zeolite-based hydrocarbon adsorbent washcoat slurry. Twin wire arc spraying (encompassed herein by the term "wire arc spraying" and by the broader term "electric arc spraying") is a known process, see e.g., U.S. Pat. No. 4,027,367, which is incorporated herein by reference. Briefly described, in the twin wire arc spray process, two feedstock wires act as two consumable electrodes. These wires are insulated from each other as they are fed to the spray nozzle of a spray gun in a fashion similar to wire flame guns.

The wires meet in the center of a gas stream generated in the nozzle. An electric arc is initiated between the wires, and the current flowing through the wires causes their tips to melt. A compressed atomizing gas, usually air, is directed through the nozzle and across the arc zone, shearing off the molten droplets to form a spray that is propelled onto the substrate. Only metal wire feedstock can be used in an arc spray system because the feedstock must be conductive. The high particle temperatures created by the spray gun produce minute weld zones at the impact point on a metallic substrate. As a result, such electric arc spray coatings (sometimes referred to herein as "anchor layers") have good cohesive strength and a very good adhesive bond to the substrate.

Thermal arc sprayed layers of a variety of compositions can be deposited on a metallic monolith honeycomb support substrate in accordance with the present invention by utilizing, without limitation, feedstocks of the following metals and metal mixtures: Al, Ni, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/Y, Fe/Ni/Al, Fe/Ni/Cr, 300 and 400 series stainless steels, and, optionally, mixtures of one or more thereof. In one embodiment, the metallic thermal arc sprayed layer may comprise nickel and aluminum. The aluminum may comprise from about 3 to 10 percent, optionally from about 6 to 8 percent, of the combined weight of nickel and aluminum in the metallic thermal arc sprayed layer.

In another embodiment, the support substrate surface can be precoated with a slurry of a high surface area refractory metal oxide, dried for about 0.5 to about 2 hours at about 90 to about 120° C. and thereafter calcined at about 450 to about 650° C. for 0.5 to about 2 hours. High surface area refractory metal oxides are well known in the prior art. Typically, the refractory metal oxide will have a specific surface area of about 60 to about 300 $m^2/g$. Useful refractory metal oxides include aluminum oxide, cerium oxide, zirconium oxide, gamma-alumina, alumina, titania, zirconia and mixtures of alumina with one or more of titania, zirconia, ceria, baria and a silicate. Preferably, the refractory metal oxide comprises gamma-alumina.

Thereafter, the refractory metal oxide-coated substrate surface is coated with a slurry of the desired adsorbent and dried (e.g., at about 105° C.). Alternatively, the refractory metal oxide-coated substrate may be coated with separate slurries of the hydrocarbon adsorbent, such as silica gel, molecular sieve and/or activated carbon to create layers, with drying between each layer occurring as described above.

If desired, a further top coat layer of the high surface area refractory metal oxide may be applied on top of the adsorbent, thereafter drying as described above after the application of each layer.

The hydrocarbon adsorbent slurry will also include a binder that will cause the material to adhere to the surface of the substrate. Such a binder is also referred to as a washcoat binder. Washcoat binders typical for use in the formulation of slurries include, but are not restricted to, the following: organic polymers; sols of alumina, silica or zirconia; inorganic salts, organic salts and/or hydrolysis products of aluminum, silica or zirconium; hydroxides of aluminum, silica or zirconium; organic silicates that are hydrolyzable to silica; and mixtures thereof.

The preferred binder is an organic polymer used in amounts of from 0.5 to 20, preferably 2 to 10, percent by weight of binder based on the weight of the material. The organic polymer may be a thermosetting or thermoplastic polymer and may be plastic or elastomeric. The polymeric binder may contain suitable stabilizers and age resistors known in the polymeric art. Most preferred are thermosetting, elastomeric polymers introduced as a latex into the adsorbent composition, preferably as an aqueous slurry. Upon application of the composition and drying, the binder material fixes the hydrocarbon adsorbent particles to themselves and the substrate surface, and in some cases, can crosslink with itself to provide improved adhesion. This enhances the integrity of the coating, its adhesion to the substrate and provides structural stability under vibrations encountered in motor vehicles. The use of a binder enables the material to adhere to the substrate without the necessity of an undercoat layer. The binder may also comprise additives to improve water resistance and improve adhesion.

Useful organic polymer binder compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics and styrene acrylics, polyvinyl alcohol, thermoplastic polyesters, thermosetting polyesters, poly (phenylene oxide), poly(phenylene sulfide), fluorinated polymers such as poly(tetrafluoroethylene)polyvinylidene fluoride, poly(vinylfluoride) and chloro/fluoro copolymers such as ethylene chlorotrifluoro-ethylene copolymer, polyamide, phenolic resins and epoxy resins, polyurethane, acrylic/styrene copolymer latex and silicone polymers. A particularly preferred polymeric binder is an acrylic/styrene copolymer latex.

It has been found that compatibility of the components of a slurry comprising a hydrocarbon adsorbent and a polymeric binder, such as a latex emulsion, is important for maintaining slurry stability and uniformity. For the purpose of the present invention compatibility means that the binder and the hydrocarbon adsorbent material remain as a mixture of separate particles in the slurry. It is believed that when the polymeric binder is a latex emulsion and the emulsion and hydrocarbon adsorbent material have electrical charges which cause the emulsion and hydrocarbon adsorbent material to repel each other, the emulsion and hydrocarbon adsorbent material are compatible and the slurry is stable and has a uniform distribution of the hydrocarbon adsorbent material and the polymer latex in the liquid vehicle, e.g. aqueous fluid such as water. If the catalytic material and latex emulsion particles do not mutually repel each other, irreversible agglomeration of the latex on the hydrocarbon adsorbent material will occur. These materials are therefore incompatible and the latex comes out of the emulsion.

For those zeolites that generate a low pH mixture when dispersed in water, additional stabilization can be achieved by increasing the pH. This is important since organic latex binder emulsions commonly used in the art are anionically charged and therefore, typically have a pH greater than 7. Combining a high pH binder emulsion with a low pH zeolite slurry creates instability that often results in slurry coagulation. The pH of the slurry can be controlled depending on the acidity of the adsorbent material, with pH levels being from about 4 to about 10. A preferred range is from about 5 to about 8, more preferably from about 6 to about 7.5.

In another embodiment, it is preferred to use a dispersant in conjunction with the binder. The dispersant may be anionic, non-ionic or cationic and is typically utilized in an amount of about 0.1 to about 10 weight percent, based on the weight of the material. Not surprisingly, the specific choice of dispersant is important. Suitable dispersants may include polyacrylates, alkoxylates, carboxylates, phosphate esters, sulfonates, taurates, sulfosuccinates, stearates, laureates, amines, amides, imidazolines, sodium dodecylbenzene sulfonate, sodium dioctyl sulfosuccinate and mixtures thereof. In one embodiment, a preferred dispersant is a low molecular weight polyacrylic acid in which many of the protons on the acid are replaced with sodium. In a particularly preferred embodiment, low molecular weight anionic dispersants such as sodium dodecylbenzene sulfonate and sodium dioctyl sulfosuccinate have been found to provide excellent zeolite dispersion and zeolite-binder stability. For example, in the case of slurry formulated with high Si/Al ratio SAL-Beta zeolite (i.e., sulfuric acid leached beta zeolite) and styrene-acrylic latex binder emulsion, low molecular weight anionic dispersants have been found to provide excellent zeolite dispersion and zeolite-binder stability. A preferred composite comprising about 90 weight percent beta zeolite, about 9 weight percent acrylic polymer latex and about 1 weight percent sodium dodecylbenzene sulfonate or sodium dioctyl sulfosuccinate.

While increasing the slurry pH or adding anionic dispersant alone may provide enough stabilization for the slurry mixture, best results may be obtained when both an increased pH and anionic dispersant are used. For example, for zeolite-based slurries that generate a low pH when dispersed in water and/or a dispersant, additional stabilization can be achieved by increasing the pH, as described above.

The hydrocarbon adsorbent slurries of the present invention, particularly slurries containing polymer latexes, can contain conventional additives such as thickeners, biocides, antioxidants and the like. In one embodiment, a thickener such as a xanthan gum thickener or a carboxymethylcellulose thickener can be used. The thickener makes it possible to achieve a sufficient amount of coating (and hence sufficient hydrocarbon adsorption capacity) on relatively low surface area substrates. The thickener may also serve in a secondary role by increasing slurry stability by steric hinderence of the dispersed particles. It may also aid in the binding of the coating surface.

The improved hydrocarbon adsorbent binding slurry of the present invention can be applied to the support substrate by any known means in the art. For example, the formulation can be applied by spray coating, powder coating, or brushing or dipping a surface into the slurry.

In another embodiment, the hydrocarbon adsorbent, e.g., a zeolite, may be extruded or shaped into the form of a support substrate, e.g., a flow-through or wall-flow monolith, that is placed within the fuel system evaporative canister. The hydrocarbon adsorbent can be extruded into a support substrate using a binder, e.g., sodium carboxymethylcellulose, as disclosed in U.S. Pat. No. 6,696,384, incorporated herein by reference. Using an extruded support substrate has the advantage of increasing the overall hydrocarbon storage capacity of the trap (i.e., more hydrocarbon adsorbent can be used) while maintaining low overall pressure drop. Wall-flow or filter type monoliths similar to those used in diesel engine particulate filtering (see, e.g., U.S. Pat. Nos. 4,390,355, 4,509,966, and 5,492,679, incorporated herein by reference) are preferred extruded support substrates since they eliminate "line-of-sight" passage of hydrocarbon vapors through the monolith and therefore promote more intimate contact of the vapors with the hydrocarbon adsorbent. Also useful would be a porous block or foam type design manufactured by any number of techniques that can impart high porosity to the finished substrate (e.g., extrusion with an organic component that is oxidized during calcination to generate substrate voids).

In yet another embodiment, a powdered zeolite-based system is a possible alternative to those of carbon particles for controlling evaporative emissions from the fuel storage system of motor vehicles. As previously mentioned, zeolites are well-known materials that have high capacity for adsorbing hydrocarbon molecules. Zeolite can be incorporated into the fuel storage evaporative control system in a variety of different forms and configurations. For example, in one embodiment, zeolite powder can be extruded into granules of any size or shape or spray dried into larger coarse particles and loaded directly into a canister (i.e., packed bed) for the purpose of adsorbing hydrocarbon vapors in the vehicle fuel storage system.

Figure 6A:
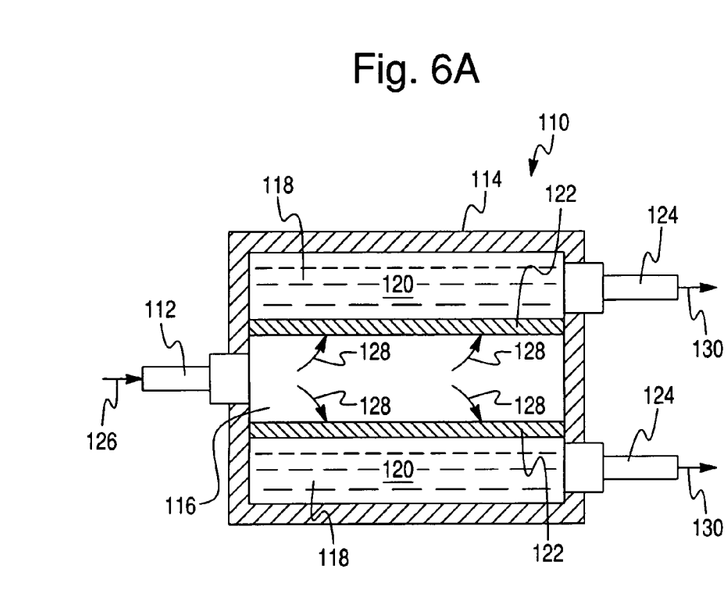
FIGS. 6A and 6B are sectional views of a cylindrical emission treatment canister, in accordance with another embodiment of the present invention.
Figure 6B:
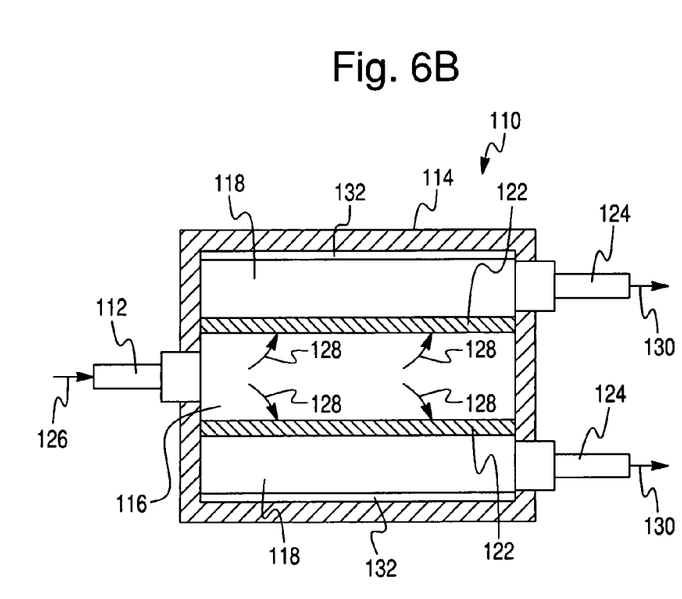

If pressure drop within the fuel system evaporative canister is a significant concern (e.g., if a spray dried powder is utilized), a packed bed incorporating any type of radial flow design can be utilized. For example, extruded zeolite can be placed within an annulus formed by nesting two cylinders of different diameters. Hydrocarbon vapors can then be trapped by the zeolite within the annulus to the other while maintaining a relatively lower overall pressure drop of the packed bed system. FIGS. 6A and 6B illustrate additional non-limiting embodiments of the emission treatment canister of the present invention, formed by nesting two cylinders of different diameters one within the other.

Referring now to FIG. 6A, the cylindrical evaporative emission treatment canister 110 comprises an outer cylinder housing 114 and an inner cylinder housing 122. The inner cylinder housing 122 has a smaller diameter than the outer cylinder housing 114 and is nestled within the outer cylinder housing 114, thereby forming two separate chambers, the inner 116 and outer chambers 118, respectively. The outer chamber 118, also known as the annulus between the inner 122 and outer cylinder housings 114, is filled with a powdered or granulated hydrocarbon adsorbent 120, such as a powdered zeolite for the treatment of evaporative hydrocarbons emissions. The inner and outer cylinder housings 122 and 114, respectively, may be formed by any suitable material. However, the inner cylinder 122 is typically a porous screen or membrane which allows vapor to pass from the inner chamber 116 to the outer chamber 118. The emission treatment canister further comprises a vapor inlet line 112, and two vapor outlet lines 124, which vent clean air to the atmosphere. The cylindrical evaporative emission treatment canister 110 of this embodiment can be used as a first or primary emission treatment canister or as a downstream emission scrubber for additional treatment of fuel vapor hydrocarbons (described in further detail hereinbelow).

Referring now to FIG. 6B, another embodiment of a cylindrical emission treatment canister is illustrated. In this embodiment, the cylindrical evaporative emission treatment canister 110 comprises an outer cylinder housing 114 and an inner cylinder housing 122. The inner cylinder housing 122 has a smaller diameter than the outer cylinder housing 114 and is nestled within the outer cylinder housing 114, thereby forming two separate chambers, the inner 116 and outer chambers 118, respectively. The outer chamber 118, also known as the annulus between the inner 122 and outer cylinder housings 114, contains a hydrocarbon adsorbent, which is coated as a washcoat 132 onto the inner surface of the outer cylinder housing 114. The inner and outer cylinder housings 122 and 114, respectively, may be formed by any suitable material. However, the inner cylinder 122 is typically a porous screen or membrane, which allows vapor to pass from the inner chamber 116 to the outer chamber 118. The emission treatment canister further comprises a vapor inlet line 112, and two vapor outlet lines 124, which vent clean air to the atmosphere. The cylindrical evaporative emission treatment canister 110 of this embodiment can be used as a first or primary emission treatment canister or as a downstream emission scrubber for additional treatment of fuel vapor hydrocarbons (described in further detail hereinbelow).

Referring to FIGS. 6A and 6B, during operation, evaporative fuel vapors (containing evaporative hydrocarbon) from a fuel tank (not shown) enter the cylindrical evaporative emission treatment canister 110 via vapor inlet line 112, represented herein by arrow 126. The evaporative vapors, which first enter inner chamber 116 can then circulate through the porous screen or membrane making up the inner cylinder 122 to the outer chamber 118, represented herein by arrows 128. The outer chamber contains or is coated with a hydrocarbon adsorbent for the treatment and/or adsorption of hydrocarbons contained within the evaporative fuel. The evaporative fuel emissions then exit the cylindrical evaporative emission treatment canister 110 via vapor outlet lines 124, show herein by arrows 130.

During engine operation engine, the cylindrical evaporative emission treatment canister 110 of the present embodiment can be regenerated with a purge stream. As described in more detail hereinabove, the purge stream can enter the cylindrical evaporative emission treatment canister 110 via vapor outlet line 124 and be directed in series through the outer chamber 118, and inner chamber 116 (see, e.g., FIG. 1). The clean air desorbs the hydrocarbons from the saturated hydrocarbon adsorbent. A stream of purge air and hydrocarbons then exits cylindrical evaporative emission treatment canister 110 via vapor inlet line 112 and is re-directed to the engine (not shown).

Figure 4:
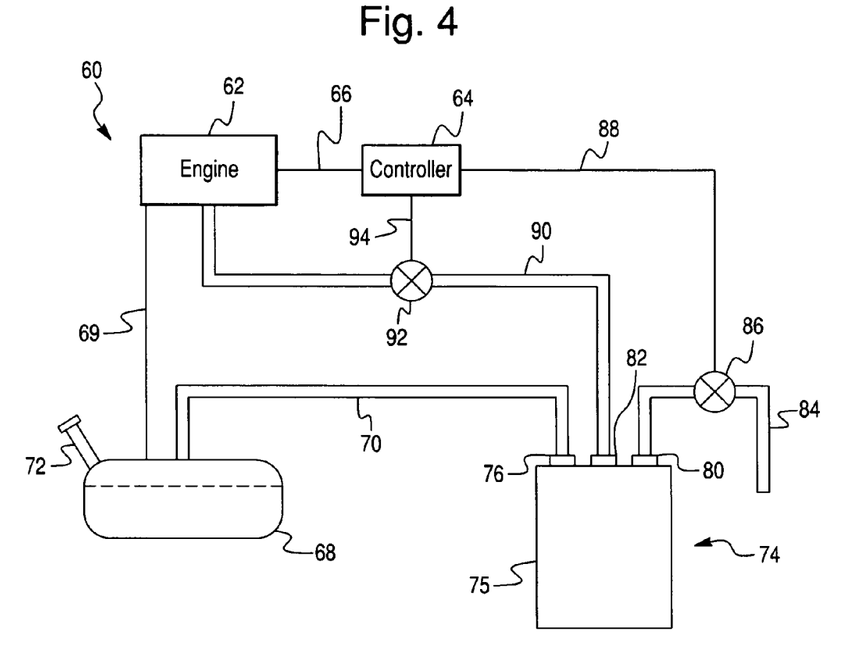
FIG. 4 is a functional block diagram of an alternative evaporative control system for a vehicle in accordance with one embodiment of the present invention.
Figure 5:
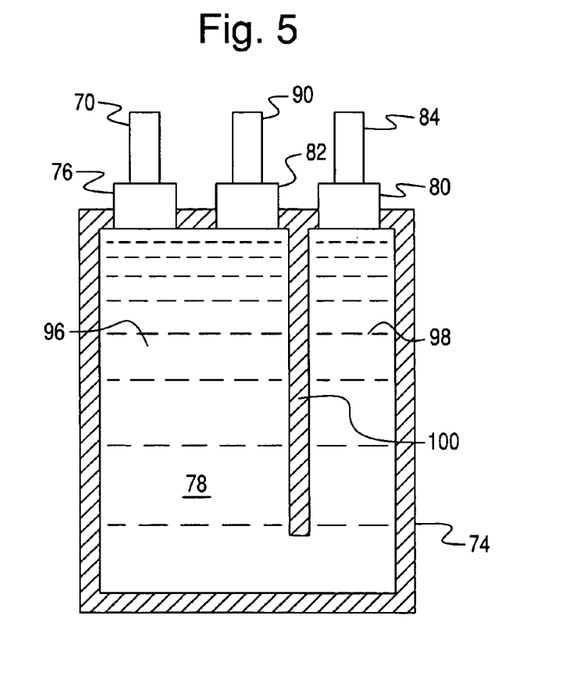
FIG. 5 is a sectional view of a canister filled with a hydrocarbon adsorbent particulate as shown in FIG. 4.

In yet another embodiment of the present invention, FIGS. 4 and 5 illustrate an evaporative emission control system 60 for a vehicle including an engine 62 is illustrated and represents one non-limiting embodiment of the present invention. Referring now to FIGS. 4 and 5, an evaporative emission control system 60 of this embodiment comprises a fuel tank 68, an evaporative vapor vent line 70, a canister 74 containing a zeolite-based hydrocarbon adsorbent material 78, and a clean air vent line 84 to the atmosphere. The canister 74 further comprises a housing 75, which contains a powdered zeolite-based hydrocarbon adsorbent material 78.

The engine 62 is preferably an internal combustion engine that is controlled by a controller 64. The engine 62 typically burns gasoline, ethanol and other volatile hydrocarbon-based fuels. The controller 64 may be a separate controller or may form part of an engine control module (ECM), a powertrain control module (PCM) or any other vehicle controller.

During engine operation, gasoline is delivered from a fuel tank 68 by a fuel pump through a fuel line to the fuel injector, all shown schematically by line 69. The timing and operation of the fuel injectors and the amount of fuel injected are managed by the controller 64, via signal line 66. The fuel tank 68 is typically a closed container except for an evaporative vapor vent line 70 and a fill tube 72. The fuel tank 68 is often made of blow molded, high density polyethylene provided with one or more gasoline impermeable interior layers.

The fuel tank 68 includes an evaporative vapor vent line 70 that extends from the fuel tank 68 to an evaporative emission treatment canister 74. Fuel vapor, containing hydrocarbons, which have evaporated from the fuel tank 68, can pass from the fuel tank 68 to the emission treatment canister 74 through evaporative vapor vent line 70. In this particular embodiment, the canister 74, as shown in FIG. 4, further comprises two separate chambers 96 and 98, respectively, which are separated by a baffle or partition 100. Both chambers 96 and 98, respectively, are filled with a powdered zeolite-based hydrocarbon adsorbent material 78. The canister 74 may be formed from any suitable material. For example, molded thermoplastic polymers such as nylon are typically used.

Fuel vapor pressure increases as the temperature of the gasoline in fuel tank 68 increases. Without the evaporative emission control system 60 of the present invention the fuel vapor would be released to the atmosphere untreated. However, in accordance with the present invention fuel vapors are treated by emission treatment canister 74. When the vent valve 86 is open, and purge valve 82 closed, fuel vapors flow under pressure from the fuel tank 68 through the evaporative vapor vent line 70, the vapor inlet 76 and sequentially through separate chambers 96 and 98, respectively, each of which are filled with a powdered zeolite-based hydrocarbon adsorbent material 78. Once treated, fuel vapors initially from fuel tank 68 exit the canister 74 as clean air via vent opening 80, the clean air vent line 84, and vent valve 86, thereby being released to the atmosphere. Gradually, the hydrocarbon adsorbent material becomes laden with hydrocarbons adsorbed from the fuel vapor.

When the zeolite-based hydrocarbon adsorbent 78 becomes saturated with fuel vapor, and thus, hydrocarbons, the hydrocarbons must be desorbed from the powdered zeolite-based hydrocarbon adsorbent 78 for continued treatment of fuel vapors from the fuel tank 68. During engine operation engine controller 64 commands valves 86 and 92, via signal leads 88 and 94, respectively, to open, thereby opening an air flow pathway between the atmosphere and the engine 62. The opening of the purge valve 92 allows clean air to be drawn into the canister 74 via the clean air vent line 84 from the atmosphere. The clean air, or purge air, flows in through the clean air vent line 84 past the vent opening outlet 80 and into canister 74. The clean air then flows through the powdered zeolite-based hydrocarbon adsorbent 78 contained within separate chambers 96 and 98. The clean air flows sequentially through separate chambers 98 and 96, respectively, desorbing hydrocarbons from the saturated powdered zeolite-based hydrocarbon adsorbent 78, contained therein. A stream of purge air and hydrocarbons then exits canister 74 through purge outlet 92 and purge line 90. The purge air and hydrocarbons flow through purge line 90 and through purge valve 92 to the engine 62. As previously mentioned, purge valve 92 is operated by the controller 64 through a signal lead 94. When the engine 62 is running, controller 64 opens purge valve 92 drawing the fuel-laden air through the purge line 90 and the purge valve 92 into the engine 62, where the hydrocarbons are subsequently combusted.

Preferred zeolites for uses as the zeolite-based hydrocarbon adsorbent material 58 of this embodiment include, but are not limited to, beta zeolite, ASM-5, Y zeolite, X zeolite, faujasite, mordenite, ferrierite, silicate and mixtures thereof. These preferred zeolite-based hydrocarbon adsorbent materials are described in more detail above.

In yet another embodiment, the evaporative emission control system of the present invention can contain a hydrocarbon bleed emission scrubber. The hydrocarbon bleed emission scrubber is fluidly connected downstream of the evaporative emission canister and strips any residual fuel vapor and/or hydrocarbons from the air flowing from the evaporative emission treatment canister before discharging the air into the atmosphere. In general, the hydrocarbon bleed emission scrubber can contain any known hydrocarbon adsorbent (e.g., molecular sieve, zeolite, carbon, etc.). In one embodiment, the hydrocarbon adsorbent is a powdered or granular hydrocarbon adsorbent packed into the hydrocarbon bleed emission scrubber. In another embodiment, the hydrocarbon adsorbent is washcoated onto a support substrate, for example, a flow-through or wall-flow monolith (described in more detail hereinabove). In yet another embodiment, the hydrocarbon adsorbent is extruded into a substrate for the treatment of evaporative hydrocarbons. For example, the hydrocarbon adsorbent can be extruded into a flow-through or wall-flow monolith (described in more detail hereinabove). Where the emission treatment system of the present invention includes both an evaporative emission treatment canister and a downstream hydrocarbon bleed emission scrubber, the scrubber can contain different substrate geometry (e.g., in the case of a flow-through monolith, a higher cell density) and/or different hydrocarbon adsorbents, to improve the overall efficiency of the emission treatment system to treat evaporative hydrocarbons.

Figure 7:
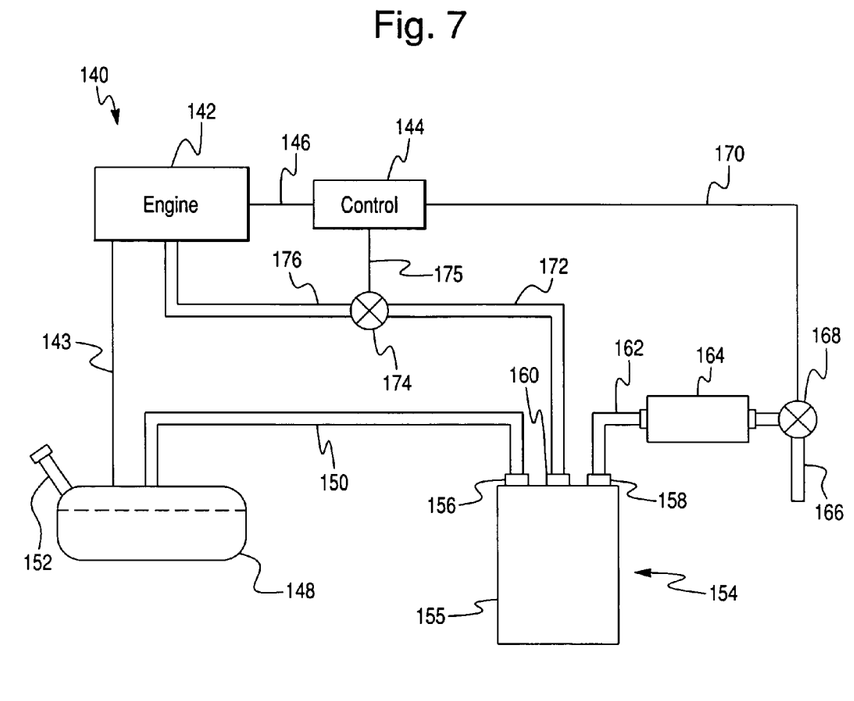
FIG. 7 is another embodiment of an emission treatment system illustrating a hydrocarbon bleed emissions scrubber.

Referring now to FIG. 7, an evaporative emission control system 140 for a vehicle including an engine 142 and including a hydrocarbon bleed emission scrubber 164, is illustrated and represents one non-limiting embodiment of the present invention. The evaporative emission control system 140 of this embodiment comprises a fuel tank 148, an evaporative vapor vent line 150, an evaporative emission treatment canister 154 containing a zeolite-based hydrocarbon adsorbent material (not shown), and a clean air vent line 166 to the atmosphere. The evaporative emission treatment canister 154 further comprises a housing 155, which contains a hydrocarbon adsorbent material.

The engine 142 is preferably an internal combustion engine that is controlled by a controller 144. The engine 142 typically burns gasoline, ethanol and other volatile hydrocarbon-based fuels. The controller 144 may be a separate controller or may form part of an engine control module (ECM), a powertrain control module (PCM) or any other vehicle controller.

During engine operation, gasoline is delivered from a fuel tank 148 by a fuel pump through a fuel line to the fuel injector, all shown schematically by line 143. The timing and operation of the fuel injectors and the amount of fuel injected are managed by the controller 144, via signal line 146. The fuel tank 148 is typically a closed container except for an evaporative vapor vent line 150 and a fill tube 152. The fuel tank 148 is often made of blow molded, high density polyethylene provided with one or more gasoline impermeable interior layers.

The fuel tank 148 includes an evaporative vapor vent line 150 that extends from the fuel tank 148 to an evaporative emission treatment canister 154. Fuel vapor, containing hydrocarbons, which have evaporated from the fuel tank 148, can pass from the fuel tank 148 to the evaporative emission treatment canister 154 through evaporative vapor vent line 150. The evaporative emission treatment canister 154 may be formed from any suitable material. For example, molded thermoplastic polymers such as nylon are typically used.

Fuel vapor pressure increases as the temperature of the gasoline in fuel tank 148 increases. Without the evaporative emission control system 140 of the present invention the fuel vapor would be released to the atmosphere untreated. However, in accordance with the present invention fuel vapors are treated by evaporative emission treatment canister 154 and in this particular embodiment by a hydrocarbon bleed emission scrubber 164 located downstream of the evaporative emission treatment canister 154. In general, any known hydrocarbon adsorbent cam be used in the hydrocarbon bleed emission scrubber 164 (e.g., a zeolite hydrocarbon adsorbent). When the vent valve 168 is open, and purge valve 160 closed, fuel vapors flow under pressure from the fuel tank 148 through the evaporative vapor vent line 150, the vapor inlet 156 and sequentially through a hydrocarbon adsorbent material contained within the evaporative emission treatment canister 154. Subsequently, the fuel vapors flow out of the evaporative emission treatment canister 154 via vent opening 158 and vent line 162. The fuel vapors then enter a hydrocarbon bleed emission scrubber 164 for further treatment. Once treated, the fuel vapors exit the hydrocarbon bleed emission scrubber 164 via the clean air vent line 166, and vent valve 168, thereby being released to the atmosphere.

Gradually, the hydrocarbon adsorbent material contained in both the evaporative emission treatment canister 154 and the hydrocarbon bleed emission scrubber 164 becomes laden with hydrocarbons adsorbed from the fuel vapor. When hydrocarbon adsorbents becomes saturated with fuel vapor, and thus, hydrocarbons, the hydrocarbons must be desorbed from the hydrocarbon adsorbents for continued treatment of fuel vapors from the fuel tank 148. During engine operation engine controller 144 commands valves 168 and 174, via signal leads 170 and 175, respectively, to open, thereby opening an air flow pathway between the atmosphere and the engine 142. The opening of the purge valve 174 allows clean air to be drawn into the hydrocarbon bleed emission scrubber 164 and subsequently into the evaporative emission treatment canister 154 via the clean air vent line 166 and vent line 162, from the atmosphere. The clean air, or purge air, flows in through the clean air vent line 166, through the hydrocarbon bleed emission scrubber 164, through vent line 162, past the vent opening outlet 158 and into evaporative emission treatment canister 154. The clean air flows past and/or through the hydrocarbon adsorbents contained within the hydrocarbon bleed emission scrubber 164 and the emission treatment canister 154, desorbing hydrocarbons from the saturated hydrocarbon adsorbents. A stream of purge air and hydrocarbons then exits evaporative emission treatment canister 154 through purge valve 174 and purge line 172. The purge air and hydrocarbons flow through purge line 172 and through purge valve 174 to the engine 142. As previously mentioned, purge valve 174 is operated by the controller 144 through a signal lead 175. When the engine 142 is running, controller 144 opens purge valve 174 drawing the fuel-laden air through the purge line 172 and the purge valve 174 into the engine 142, where the hydrocarbons are subsequently combusted.

What is claimed is:

1. An evaporative emissions control system for reducing evaporative emissions from a motor vehicle fuel tank, wherein said evaporative emissions system comprises an evaporative emissions treatment canister coupled to said fuel tank, wherein a hydrocarbon adsorbent is coated as a washcoat slurry on a support substrate contained within said canister, wherein said support substrate is selected from the group consisting of ceramic, metallic and plastic wall-flow monolith, ceramic, metallic and polymeric foams, metallic foils, metallic screens, metallic meshes, metallic woven wires and polymeric fibers, and wherein said washcoat slurry comprises:

a) one or more hydrocarbon adsorbents for the adsorption of evaporative hydrocarbons;
   b) an organic polymer binder to improve the adhesion of said hydrocarbon adsorbent to the surface of said canister; and
   c) an anionic dispersant.

2. The evaporative emissions control system of claim 1, wherein said evaporative emissions control system further comprises a hydrocarbon bleed emission scrubber containing a second hydrocarbon adsorbent and wherein said hydrocarbon bleed emission scrubber is located downstream of said evaporative emissions treatment canister for further treatment of evaporative emissions.

3. The evaporative emissions control system of claim 2, wherein said second hydrocarbon adsorbent is coated as a washcoat slurry on a second support substrate contained within said hydrocarbon bleed emission scrubber.

4. The evaporative emissions control system of claim 3, wherein said second support substrate is selected from the group consisting of ceramic and metallic honeycomb monoliths, a wall-flow monolith, ceramic and metallic foams, metallic foils, metallic screens, metallic meshes, and metallic woven wires.

5. The evaporative emissions control system of claim 2, wherein said second support substrate is extruded from said second hydrocarbon adsorbent.

6. The evaporative emissions control system of claim 2, wherein said hydrocarbon bleed emission scrubber comprises an outer cylinder and an inner cylinder placed within said outer cylinder so as to provide an annular space between said inner and outer cylinders, said inner cylinder formed at least in part of a porous material to allow evaporative emissions to pass there through, said annular space containing said second hydrocarbon adsorbent or said outer cylinder being coated with said second hydrocarbon adsorbent, said scrubber having an inlet for evaporative emissions and an outlet for directing evaporative emissions treated with said second hydrocarbon adsorbent from said hydrocarbon bleed emission scrubber.

7. The evaporative emissions control system of claim 1, wherein said hydrocarbon adsorbent comprises a molecular sieve.

8. The evaporative emissions control system of claim 7, wherein said molecular sieve is selected from the group consisting of faujasite, chabazite, clinoptilolite, mordenite, silicalite, zeolite X, zeolite Y, ultrastable zeolite Y, ZSM zeolite, offretite, and beta zeolite.

9. The evaporative emissions control system of claim 1, wherein said substrate support is extruded with said hydrocarbon adsorbent.

10. The evaporative emissions control system of claim 9, wherein said hydrocarbon adsorbent is selected from the group consisting of faujasite, chabazite, clinoptilolite, mordenite, silicalite, zeolite X, zeolite Y, ultrastable zeolite Y, ZSM zeolite, offretite, and beta zeolite.

11. The evaporative emissions control system of claim 1, wherein said support substrate is a wall-flow monolith coated with a hydrocarbon repellent membrane and wherein said first hydrocarbon adsorbent is coated over said membrane.

12. The evaporative emissions control system of claim 11, wherein said evaporative emissions control system further comprises a hydrocarbon bleed emission scrubber containing a second hydrocarbon adsorbent and wherein said hydrocarbon bleed emission scrubber is located downstream of said evaporative emissions treatment canister for further treatment of evaporative emissions.

13. The evaporative emissions control system of claim 12, wherein said second hydrocarbon adsorbent is selected from the group consisting of silica gel, a molecular sieve, activated carbon, and mixtures thereof.

14. The evaporative emissions control system of claim 2, wherein said second hydrocarbon adsorbent is selected from the group consisting of silica gel, a molecular sieve, activated carbon, and mixtures thereof.

15. The evaporative emissions control system of claim 1, wherein said substrate support is coated with a high-surface area undercoat and said undercoat is coated with said hydrocarbon adsorbent washcoat slurry.

16. An evaporative emissions control system for reducing evaporative emissions from a motor vehicle fuel tank, wherein said evaporative emissions system comprises an evaporative emissions treatment canister coupled to said fuel tank, wherein a hydrocarbon adsorbent is coated as a washcoat slurry on a support substrate contained within said canister, wherein said support substrate is selected from the group consisting of ceramic, metallic and plastic wall-flow monolith, ceramic, metallic and polymeric foams, metallic foils, metallic screens, metallic meshes, metallic woven wires and polymeric fibers, and wherein said washcoat slurry comprises:
   a) one or more hydrocarbon adsorbents for the adsorption of evaporative hydrocarbons;
   b) an organic polymer binder to improve the adhesion of the hydrocarbon adsorbent to the surface of a fuel storage, fuel delivery, or air intake system component; and
   c) a slurry pH from about 4 to about 10 to stabilize said slurry.

17. The evaporative emissions control system of claim 16, wherein said hydrocarbon adsorbent washcoat slurry is further stabilized with an anionic dispersant.

18. The evaporative emission control system of claim 16, wherein said hydrocarbon adsorbent is a molecular sieve and said molecular sieve is selected from the group consisting of faujasite, chabazite, clinoptilolite, mordenite, silicalite, zeolite X, zeolite Y, ultrastable zeolite Y, ZSM zeolite, offretite, and beta zeolite.

19. The evaporative emissions control system of claim 16, wherein said substrate support is coated with a high-surface area undercoat and said undercoat is coated with said hydrocarbon adsorbent washcoat slurry.

* * * * *